United States Patent
Maruyama et al.

(10) Patent No.: US 12,296,390 B2
(45) Date of Patent: May 13, 2025

(54) INSERT BEARING AND MANUFACTURING METHOD THEREOF, SINTERED BEARING SUITABLE FOR INSERT BEARING, SINTERED INSERT COMPONENT AND MANUFACTURING METHOD THEREOF, AND SINTERED COMPONENT SUITABLE FOR SINTERED INSERT COMPONENT

(71) Applicant: DIAMET CORPORATION, Niigata (JP)

(72) Inventors: Tsuneo Maruyama, Niigata (JP); Shinichi Takezoe, Niigata (JP); Hideo Sakai, Niigata (JP)

(73) Assignee: DIAMET CORPORATION, Niigata (JP)

( * ) Notice: Subject to any disclaimer, the term of this patent is extended or adjusted under 35 U.S.C. 154(b) by 798 days.

(21) Appl. No.: 17/432,782

(22) PCT Filed: Feb. 21, 2020

(86) PCT No.: PCT/JP2020/006984
§ 371 (c)(1),
(2) Date: Aug. 20, 2021

(87) PCT Pub. No.: WO2020/175351
PCT Pub. Date: Sep. 3, 2020

(65) Prior Publication Data
US 2022/0001446 A1   Jan. 6, 2022

(30) Foreign Application Priority Data
Feb. 28, 2019   (JP) .................................. 2019-036260
Jan. 17, 2020   (JP) .................................. 2020-005806

(51) Int. Cl.
*B22F 5/10*   (2006.01)
*B22F 7/08*   (2006.01)
(Continued)

(52) U.S. Cl.
CPC ............... *B22F 5/106* (2013.01); *B22F 7/08* (2013.01); *F16C 17/02* (2013.01); *F16C 33/14* (2013.01); *F16C 2220/20* (2013.01)

(58) Field of Classification Search
CPC ...... B22F 5/106; B22F 7/08; B22F 2003/033; B22F 2005/005; B22F 2998/10;
(Continued)

(56) References Cited

U.S. PATENT DOCUMENTS

2006/0039638 A1*  2/2006  Takizawa .............. F16C 33/104
                                                         384/279
2009/0103840 A1*  4/2009  Hibi ........................ F16C 33/20
                                                         384/100
2015/0377300 A1   12/2015 Sato et al.

FOREIGN PATENT DOCUMENTS

CN   1737385 A    2/2006
JP   09-193192 A  7/1997
(Continued)

OTHER PUBLICATIONS

JP2015010249A Translation (Year: 2015).*
(Continued)

*Primary Examiner* — Brian D Walck
*Assistant Examiner* — Danielle Carda
(74) *Attorney, Agent, or Firm* — Leason Ellis LLP; Melvin C. Garner; Mitsuhiro Haraguchi

(57) ABSTRACT

A sintered component forming step is for forming a sintered component by powder molding. An insert forming step is for forming a sintered insert component in which an exterior component is integrated on an outer peripheral portion of the sintered component. One or more grooves or ridges are formed on an outer peripheral portion of a region except for one end portion of the sintered component in the sintered component forming step. The insert forming step includes a step for bringing the outer peripheral portion of the end
(Continued)

portion into contact with an inner peripheral surface of an insert forming mold along a circumferential direction and covering the one or more grooves or ridges by the insert forming mold with an interval to form a cavity on an outer peripheral portion of the sintered component and a step for filling a melted material in the cavity.

2 Claims, 20 Drawing Sheets

(51) Int. Cl.
*F16C 17/02* (2006.01)
*F16C 33/14* (2006.01)

(58) Field of Classification Search
CPC .... B22F 5/10; B22F 7/06; F16C 17/02; F16C 33/14; F16C 2220/20; F16C 2220/04; F16C 33/128; F16C 33/145; B29C 45/14598; B29C 2045/14131; B29L 2031/04

USPC ............................................................ 419/8
See application file for complete search history.

(56) References Cited

FOREIGN PATENT DOCUMENTS

| JP | 2003-159720 A | | 6/2003 |
| JP | 2003-193113 A | | 7/2003 |
| JP | 2010-96200 A | | 4/2010 |
| JP | 2015010249 A | * | 1/2015 |
| JP | 2015-98921 A | | 5/2015 |
| JP | 2015098921 A | * | 5/2015 |
| JP | 2016-11740 A | | 1/2016 |

OTHER PUBLICATIONS

JP2015098921A Translation (Year: 2015).*
International Search Report mailed May 19, 2020 for the corresponding PCT International Application No. PCT/JP2020/006984.

* cited by examiner

INSERT BEARING AND MANUFACTURING METHOD THEREOF, SINTERED BEARING SUITABLE FOR INSERT BEARING, SINTERED INSERT COMPONENT AND MANUFACTURING METHOD THEREOF, AND SINTERED COMPONENT SUITABLE FOR SINTERED INSERT COMPONENT

CROSS-REFERENCE TO RELATED PATENT APPLICATIONS

This application is a U.S. National Phase Application under 35 U.S.C. § 371 of International Patent Application No. PCT/JP2020/006984 filed on Feb. 21, 2020 and claims the benefit of priority to Japanese Patent Applications No. 2019-036260, filed Feb. 28, 2019 and No. 2020-005806, filed Jan. 17, 2020, the contents of all of which are incorporated herein by reference in their entireties. The International Application was published in Japanese on Sep. 3, 2020 as International Publication No. WO/2020/175351 under PCT Article 21 (2).

FIELD OF THE INVENTION

The present invention relates to an insert bearing in which a sintered bearing and an exterior component are integrated, a manufacturing method thereof, a sintered bearing suitable for the insert bearing, a sintered insert component and a manufacturing method thereof, and a sintered component suitable for the sintered insert component. Priority is claimed on Japanese Patent Application No. 2019-36260 filed Feb. 28, 2019 and Japanese Patent Application No. 2020-5806 filed Jan. 17, 2020, the content of which is incorporated herein by reference.

BACKGROUND OF THE INVENTION

A sintered bearing in which lubricating oil is impregnated in advance inside a sintered body can lubricate a friction surface by exuding oil by a pump action of a rotation of a shaft and thermal expansion by frictional heat to be used for long time without supplying oil; so that it is broadly applied as a bearing of a rotating shaft for an automobile, a home electric appliance, audio equipment and the like.

In order to incorporate such a sintered bearing into a structure of an automobile and the like, it is integrated with an exterior component such as a housing and the like by insert molding. In this case, since a radial load and a thrust load affect the sintered bearing, it is necessary to prevent both rotation to the exterior component and falling in an axial direction.

For example, Japanese Unexamined Patent Application, First Publication No. 2003-159720 discloses a sintered bearing (sintered component) in which bottomed grooves extending along an axial direction are formed on an outer peripheral surface at positions which are not overlapped each other from both end surfaces to the middle of the axial direction. It is described that when a resin component (exterior component) is integrally formed on the outer peripheral surface of the sintered bearing by insert molding, since the resin enters in the bottomed grooves, it is possible to prevent the rotation and the falling in the axial direction.

Japanese Unexamined Patent Application, First Publication No. 2003-193113 discloses a form in which a groove portion extending in an axial direction and an enlarged diameter portion extending in a circumferential direction are formed on an outer peripheral surface of a sintered bearing (sintered component) so that the groove portion divides the extension of the enlarged diameter portion along the circumferential direction. When the resin component is integrally formed on the outer peripheral portion of the sintered bearing, the sintered bearing is prevented from rotating to the resin component by the resin entering in the groove portion and the sintered bearing is prevented from falling in the axial direction by integrally forming the enlarged diameter portion biting into the resin portion.

CITATION LIST

Patent Document

[Patent Document 1]
Japanese Unexamined Patent Application, First Publication No. 2003-159720
[Patent Document 2]
Japanese Unexamined Patent Application, First Publication No. 2003-193113

Technical Problem

When insert molding the sintered component such as the sintered bearing and the like into the resin component, a space (cavity) is formed in an outer peripheral portion of the sintered component disposed in a molding die, and melted resin is injected in the cavity and fill. At this time, in order to cover the outer peripheral portion of the sintered component by the resin component, the cavity is formed around the outer peripheral portion thereof in a state in which both end surfaces of the sintered component are brought into contact with the molding die.

However, injection pressure acts on the melted resin filled in the cavity, so that the melted resin enters the contact surface between the sintered component and the molding die, and a thin resin film may be formed on each end surface of the sintered component. If the resin film is formed on both end surfaces of the sintered component, the appearance may be deteriorated and furthermore it may interfere with another component.

The present invention is achieved in consideration of the above circumstances, and has an object to integrate a sintered component and an exterior component such as a resin component by insert molding without forming a film on at least one end surface of the sintered component such as a sintered bearing.

SUMMARY OF THE INVENTION

Solution to Problem

A manufacturing method of an insert bearing of the present invention includes: a step of forming a sintered bearing forming a sintered bearing by powder molding and a step of forming an insert forming an insert bearing in which an exterior component is integrated with an outer circumference of the sintered bearing;

in the step of forming sintered bearing, a large diameter portion having an outer diameter is formed on the outer peripheral portion of the sintered bearing than both end portions, and one or more grooves or ridges extending along an axis direction are formed on an outer peripheral surface of the large diameter portion; and in the step of forming the insert includes:

a mold assembling step forming a cavity on the outer peripheral portion of the sintered bearing by bringing an outer peripheral surface of a tip end portion of both the end portions of the sintered bearing into contact with an inner peripheral surface of an insert mold along a circumference direction and covering around the base end portion of each end portion and the large diameter portion with leaving a space; and a filling step filling melted material to be the exterior component in the cavity after the mold assembling step.

An insert bearing of the present invention has a sintered bearing and an exterior component integrally formed on an outer peripheral portion of the sintered bearing: the sintered bearing has a large diameter portion provided on the outer peripheral portion and having larger diameter than both ends, and one or more grooves or ridges provided on an outer peripheral portion of the large diameter portion and extending along an axis direction; and a base end of each end portion of the sintered bearing except for each tip end and the large diameter portion are embedded in the exterior component.

A sintered bearing suitable for the insert bearing has a large diameter portion provided on an outer peripheral portion and having a larger diameter than both end portions, and one or more grooves or ridges provided on an outer peripheral portion of the large diameter portion and extending along an axis direction.

According to the present invention, since the sintered bearing and the exterior component such as a resin portion are prevented from rotating by the groove or the ridge of the sintered bearing and are integrated in a state in which they are prevented from falling out in the axis direction by the large diameter portion, and since the base portion at each end portion and the large diameter portion are embedded in the exterior component except for the tip end of each end portion of the sintered bearing, the end surface of each end surface of the sintered bearing is prevented from being covered with material of the exterior component like a film.

For the step of forming the insert, various methods such as insert injection molding, insert casting can be applied. There is a case in which the "mold assembling step" forming the cavity in the step of forming the insert is known by a different name; for example, in the injection molding method, it is named "a mold clamping step". Similarly, the "filling step" to fill material into the cavity is named an "injection step" in the injection molding method, for example.

As one aspect of the above-described sintered bearing, the one or more grooves or ridges are formed over an entire length of the large diameter portion. Alternatively, the one or more grooves or ridges may be formed from one end surface to a middle of an axis direction of the large diameter portion.

As one aspect of the above-described sintered bearing, a tapered portion in which an outer diameter is increased toward the large diameter portion may be formed on each of the end portion.

In this case, although the inner peripheral surface of the insert mold is in contact with the outer peripheral surface of both end surfaces of the sintered bearing, the insert folding mold is in contact with the tapered portion, a gap between the insert mold is not easily generated. Accordingly, it is possible to reliably prevent leakage of melted material due to pressure during filling of the melted material.

A manufacturing method of a sintered insert component of the present invention has a sintered component forming step to form the sintered component having one end portion by powder molding and an insert forming step to form a sintered insert component in which an exterior component is integrated with an outer peripheral portion of the sintered component;

in the forming step of the sintered component,
one or more grooves or ridges extending along an axis direction are formed on an outer peripheral portion of a region except for the end portion of the sintered bearing, and the insert forming step includes
a mold assembling step bringing an outer peripheral surface of the end portion into contact with an inner peripheral surface of the insert mold along a circumference direction, and covering around the one or more grooves or ridges in the region except for the end portion with the spaced insert mold to form a cavity on the outer peripheral portion of the sintered component; and a filling step filling melted material to be the exterior component into the cavity after the mold assembling step.

A sintered insert component of the present invention has a sintered component having a first end portion and an exterior component integrally formed on an outer peripheral portion of the sintered component; the sintered component has one or more grooves or ridges provided on the outer peripheral portion in a region except for the first end portion; and the outer peripheral portion in a region except for a tip end of the first end portion of the sintered component is embedded in the exterior component.

The sintered component appropriate for the sintered insert component has at least one grooves or ridges formed on an outer peripheral portion of a region except for an end portion.

According to the present invention, since the sintered component and the exterior component such as a resin component are stopped not to rotate by the groove or the ridge of the sintered component and are integrated, and since the outer peripheral portion is embedded in the exterior component except for the tip end of the first end portion of the sintered component, it is prevented that the end face of the first end portion of the sintered component is filmy covered with material of the exterior component.

As one embodiment of the sintered insert component, it is preferable that: a large diameter portion in which an outer diameter is larger than the first end portion be provided; the one or more grooves or ridges be provided on at least either one of an outer peripheral surface or an end surface of the large diameter portion; the one or more grooves or ridges provided on the outer peripheral surface of the large diameter portion extend along an axis direction; and the one or more grooves or ridges provided on the end surface of the large diameter portion extend along a radial direction. The sintered component may be a sintered bearing.

As one aspect of the sintered insert component, it is preferable that: the sintered component have a second end portion and be provided with a large diameter portion in which an outer diameter is larger than the first end portion and the second end portion; the one or more grooves or ridges be provided at least either one of an outer peripheral surface or an end surface of the large diameter portion; the one or more grooves or ridges provided on the outer peripheral surface of the large diameter portion extend along an axis direction; the one or more grooved or ridges provided on the end surface of the large diameter portion extend along a radial direction; and in the exterior component each base end portion except for a tip end of the first and second end portions and the large diameter portion be embedded.

The sintered component of the present invention has one or more grooves or ridges formed on an outer peripheral portion on a region except for at least one end portion.

A sintered bearing of the present invention has a first end portion and a large diameter portion provided on an outer peripheral portion on a region except for the first end portion and having a larger diameter than the first end portion; one or more grooves or ridges are provided on at least one of an outer peripheral surface or an end surface of the large diameter portion; the one or more grooves or ridges provided on the outer peripheral surface of the large diameter portion extend along an axis direction; and the one or more grooves or ridges provided on the end surface of the large diameter portion extend along a radial direction.

As one aspect of the sintered bearing, it is applicable that the one or more grooves or ridges provided on the outer peripheral surface of the large diameter portion be formed along the axis direction over an entire length of the outer peripheral surface of the large diameter portion, or be formed along the axis direction from one end surface to a middle of the axis direction of the large diameter portion.

As one aspect of the sintered bearing, it is preferable that a tapered portion in which an outer diameter increases toward the large diameter be formed on the first end portion.

In this case, in the insert forming step, since the tapered portion is provided on the outer peripheral surface of the first end portion of the sintered bearing with which the inner peripheral surface of the insert mold is in contact, a gap is hardly generated between the insert mold. Accordingly, leakage of the melted material due to the pressure of filling the melted material can be reliably prevented.

Advantageous Effects of Invention

In the present invention, a sintered component such as a sintered bearing and an exterior component are held not to rotate by grooves or ridges of the sintered component and integrated, and the sintered component and the exterior component can be integrated by injection molding without generating a film of material of the exterior component on at least one end surface of the sintered component.

DETAILED DESCRIPTION OF THE INVENTION

Embodiments of the present invention will be explained below. The following embodiments are embodiments in which a resin component is integrated to a sintered bearing by injection molding. That is, in each embodiment, an exterior component of the present invention is a resin component; and an insert forming step is an injection molding step.

In addition, in the following embodiments, it is explained with exemplifying sintered bearings as a sintered component and a sintered insert bearing as a sintered insert component.

In embodiments stated later from a first embodiment to a sixth embodiment, explained is an example in which a large diameter portion is provided at substantially a middle of an axis direction of an outer peripheral portion of a sintered bearing used for an insert bearing and an outer diameter of the large diameter portion is larger than each end portion of the sintered bearing.

First Embodiment

Figure 1:
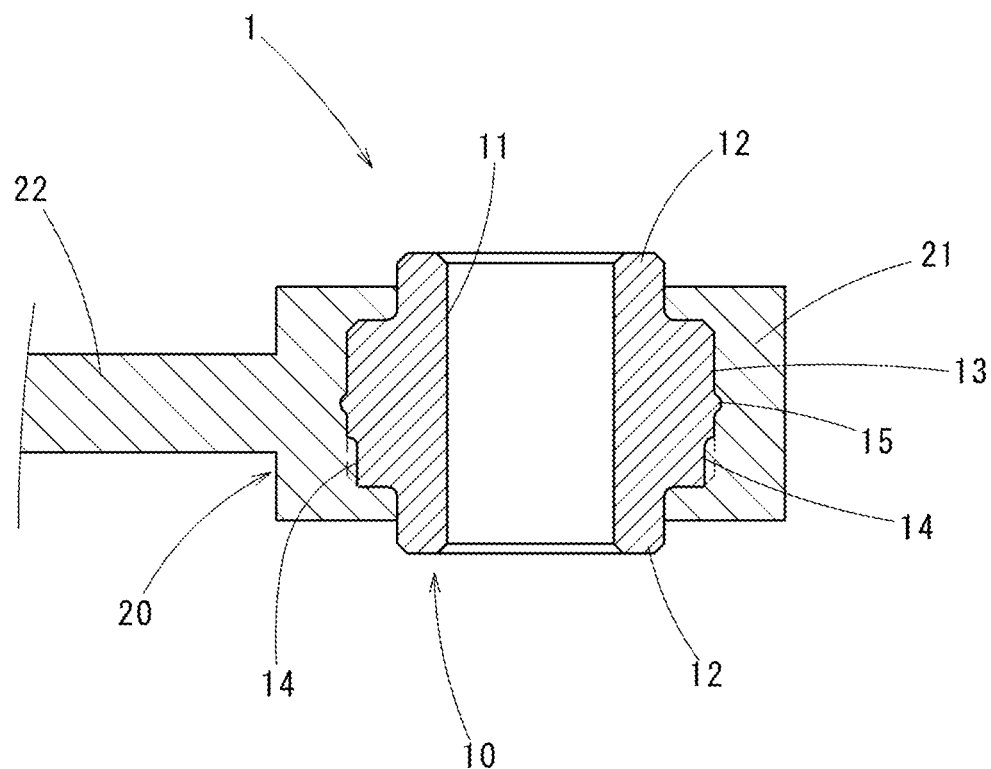
FIG. 1 is a cross sectional view showing an insert bearing of a first embodiment of the present invention.

An insert bearing 1 has a tubular sintered bearing 10 formed from a sintered body of metal powder and a resin component 20 (corresponding to an exterior component of the present invention) formed integrally with an outer peripheral portion of the sintered bearing 10, as shown in FIG. 1.

Figure 2:
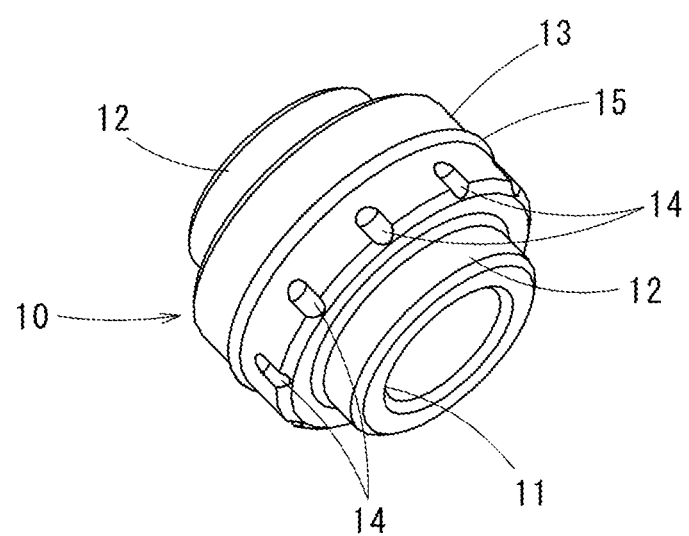
FIG. 2 is a perspective view of a sintered bearing used for the insert bearing of FIG. 1.
Figure 3:
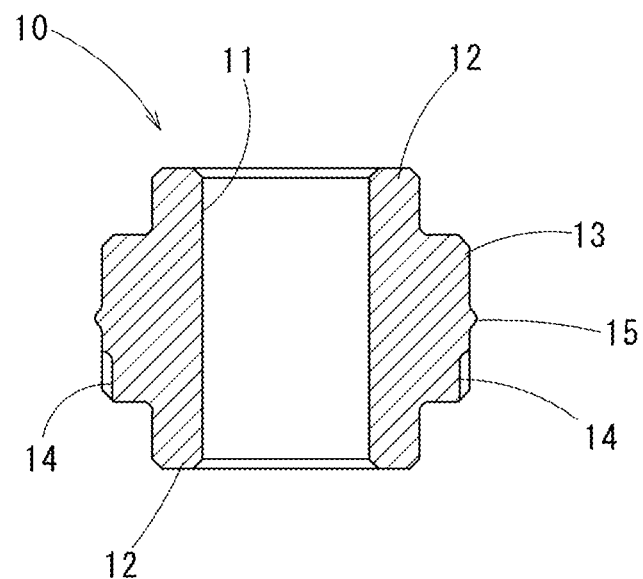
FIG. 3 is a vertical cross-sectional view of the sintered bearing of FIG. 2.
Figure 4:
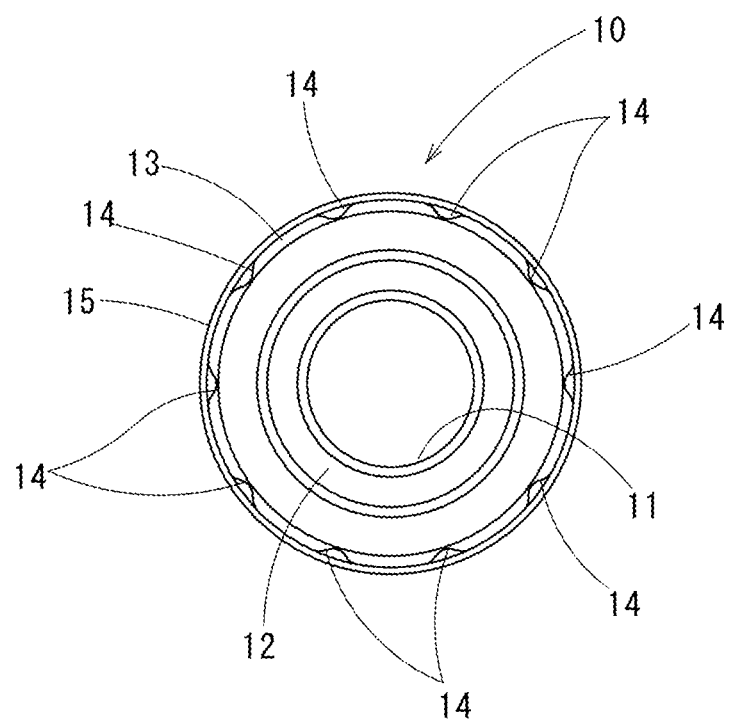
FIG. 4 is an end view of the sintered bearing of FIG. 2 viewed from one side of an axis direction.

As shown in FIG. 2 to FIG. 4, the sintered bearing 10 has a shaft bore 11 formed to penetrate a center, and be formed in a stepped shape in which an outer diameter is larger in a middle portion of an axis direction than both end portions 12. In the first embodiment, the end portions 12 with a small diameter are formed to have the same outer diameter, the same length (height); and a large diameter portion 13 at the middle portion is formed to have a length (height) except for the end portions 12.

On an outer peripheral portion of the large diameter portion 13, plurality of grooves 14 extending from an end to a middle position in the axis direction are formed at intervals in the circumferential direction. In the embodiment, ten grooves shorter than half the length (height) of the large diameter portion 13 are formed at 36° intervals. The grooves 14 are formed to be a shape in which a deepest portion is concave arc surface and both sides thereof are connected to an outer peripheral surface of the large diameter portion 13 (refer to FIG. 4).

In the first embodiment, an annular rib 15 protruding in a radius direction is formed along the circumference direction at a middle position of the axis direction of the large diameter portion 13.

The resin component 20 is, for example, an exterior component to which the sintered bearing 10 is mounted constituting a portion of an automobile, a housing of a household electric application, a machine component and the like; and it is provided as shown in FIG. 1 so that each tip end of the both end portions 12 are exposed on the outer peripheral portion of the sintered bearing 10 and so as to embed the base end portions (a portion of the root) of the end portions 12 and the large diameter portion 13 therein.

That is, in the resin component 20, a shaft holding portion 21 is integrally fixed to the outer peripheral portion of the sintered bearing 10; the shaft holding portion 21 is formed with a smaller height than an entire height of the sintered bearing 10; and from the middle position of the end portions 12 of the sintered bearing 10 in the axis direction to the entire of the large diameter portion 13 are embedded in the shaft holding portion 21. Therefore, both end surfaces of the large diameter portion 13 are covered by the shaft holding portion 21. A reference symbol 22 denotes a bracket to be connected to another component.

A method of manufacturing the insert bearing 1 made as above described (a manufacturing method of a sintered insert component) will be explained.

Figure 5:
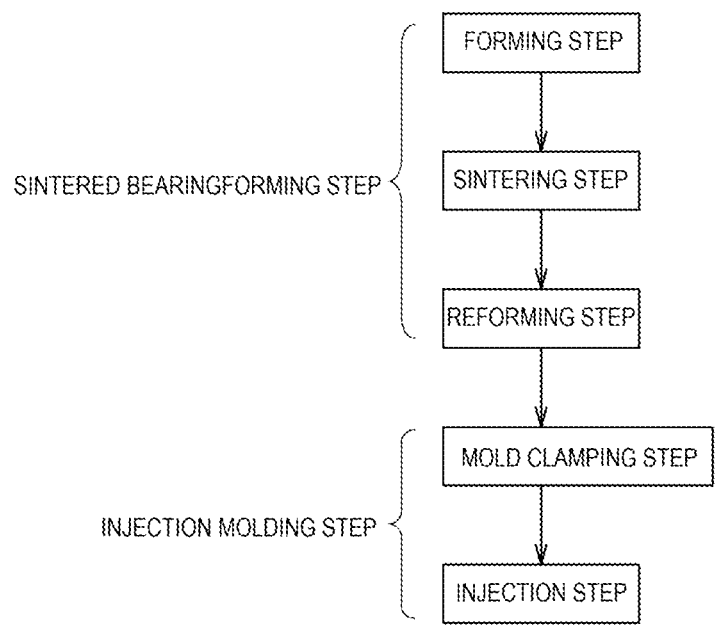
FIG. 5 is a flowchart showing a manufacturing process of an insert bearing of a first embodiment.

When the insert bearing 1 is manufactured, as shown in a flow chart of FIG. 5, it is manufactured by carrying out a step of forming a sintered bearing (sintered component forming step) forming the sintered bearing 10 by powder molding, and an injection molding step (corresponding to an insert forming step of the present invention) forming the resin component 20 integrally on the outer peripheral portion of the sintered bearing 10 by arranging the sintered bearing 10 formed by the sintered bearing forming step in an injection mold or an injection forming mold 60 (corresponding to an insert mold of the present invention) and injection molding. Steps in order will be described below.

<Step of Forming Sintered Bearing>

The step of forming the sintered bearing includes a forming step forming a formed body 10A to be the sintered bearing 10, a sintering step forming a sintered body (not shown) by sintering the formed body 10A, and a reforming step (sizing step) of reforming the sintered body.

(Forming Step)

Figure 6:
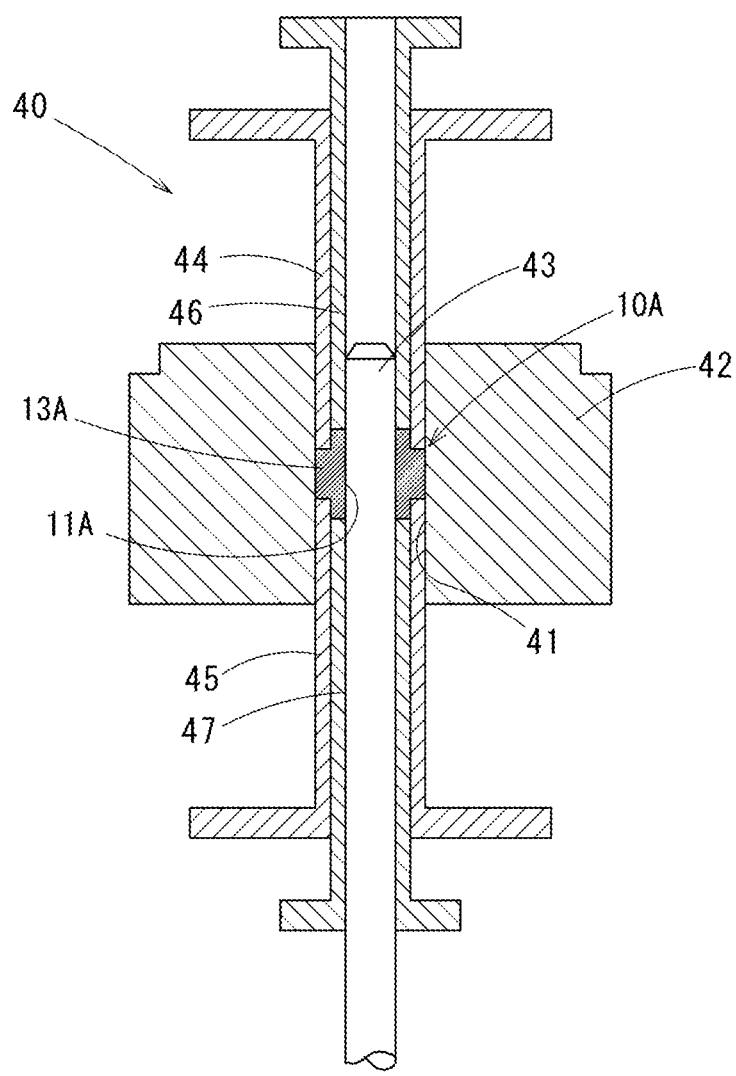
FIG. 6 is a vertical cross-sectional view showing a state of forming a forming body in a forming step.

In a forming mold 40 for forming the formed body 10A, as shown in FIG. 6, a first upper punch 44 and a first lower punch 45, and a second upper punch 46 and a second lower punch 47 are provided to make upper/lower pairs respectively, between a die 42 in which a circular penetrate hole 41 is formed and a core rod 43 disposed in the penetrate hole 41. The punches 44 to 47 are formed in a concentric cylindrical shape with the core rod 43 as a center.

Powder is filled in a space formed between the die 42, the core rod 43, the first lower punch 45 and the second lower punch 47 and pressurized by the upper and lower punches 44 to 47, so that the formed body 10A is formed. At this time, by reducing the distance between the first punches 44 and 45 than the distance between the second punches 46 and 47, the formed body 10A with the stepped shape in which the large diameter portion 13A is formed on the outer peripheral portion is formed. The shaft bore 11A is formed in a through state by the core rod 43.

(Sintering Step)

The obtained formed body 10A is heated to sinter the powder and form a sintered body.

(Reforming Step)

Reforming (sizing) is performed on the sintered body by a reforming mold 50. In the reforming step, an external form is finished into a final size and the grooves 14 are formed on the outer peripheral portion of the large diameter portion 13.

Figure 7:
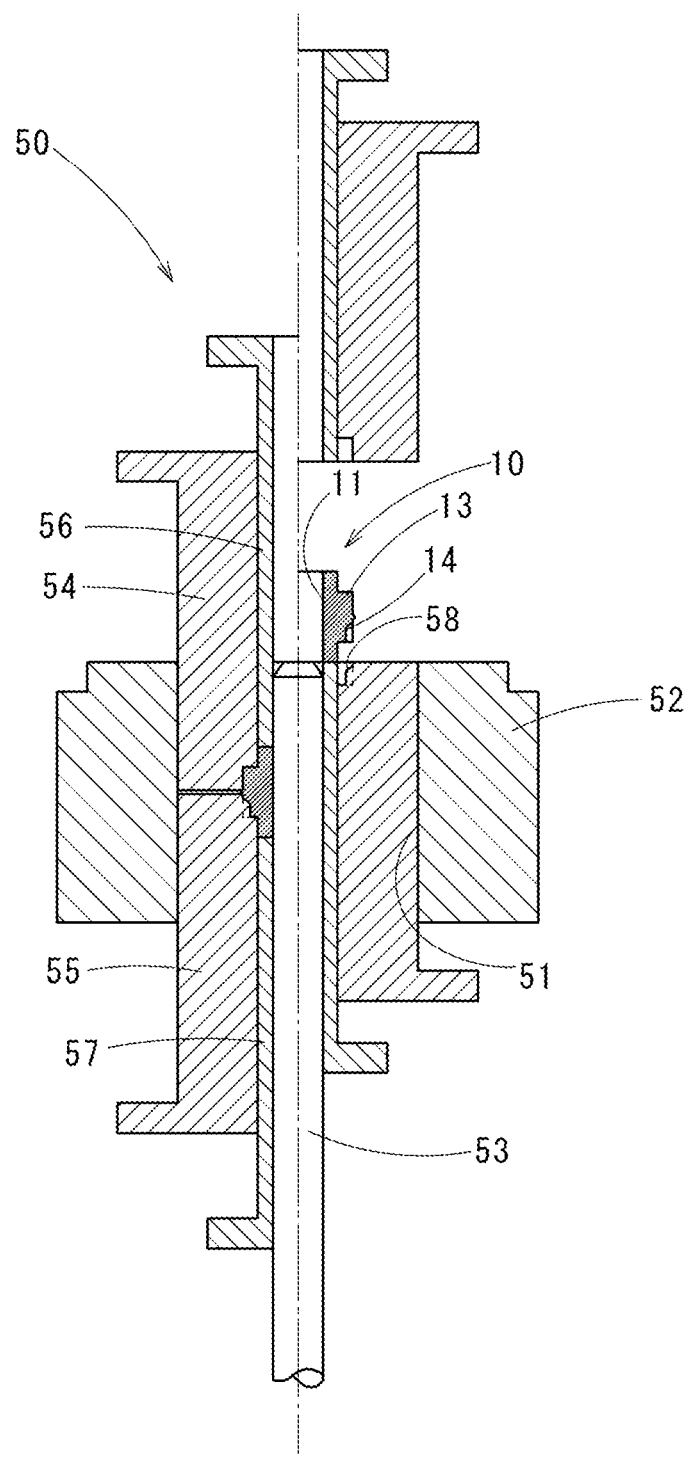
FIG. 7 is a vertical cross-sectional view in which a left half shows a state of reforming a sintered body and a right half shows a state of taking the sintered body off from a reforming mold, in a reforming step.

The reforming mold 50 has a similar structure as that of the forming mold 40, as shown in FIG. 7, and is provided with a first upper punch 54 and a first lower punch 55, and a second upper punch 56 and a second lower punch 57 respectively from outside, forming each upper/lower pair, between a die 52 in which a circular penetrate hole 51 is formed and a core rod 53 disposed in the penetrate hole 51. These punches 54 to 57 are formed in a concentric cylindrical shape with the core 53 as a center.

Protrusions 58 are formed on an upper end portion of the first lower punch 55 to form the grooves 14. The sintered body is reformed by press inserting the sintered body between the die 52 and the core rod 53 by the first punches 54 and 55 and the second punches 56 and 57 with applying pressure in the axis direction.

The first upper punch 54 and the first lower punch 55 are not brought into contact with each other and reform the outer peripheral surface of the large diameter portion of the sintered body to a middle position of the height direction.

The penetrate hole 51 of the die 52 is not in contact with the sintered body (the sintered bearing 10). Therefore, in the sintered body (the sintered bearing 10) after reforming, the annular rib 15 along the circumference direction is formed at the middle position of the height direction on the outer peripheral portion of the large diameter portion 13 with the grooves 14.

<Injection Molding Step>

The sintered bearing 10 formed as above described is integrated with the resin component 20 by the injection molding step. The injection molding step includes: a mold clamping step (corresponding to the mold assembling step of the present invention) disposing the sintered bearing 10 in an injection forming mold 60 in a state in which a cavity 61 is formed outside the sintered bearing 10, and an injection step (corresponding to the filling step of the present invention) injecting melted resin (corresponding to the melted material of the present invention) to be the resin component into the cavity 61.

(Mold Clamping Step)

Figure 8:
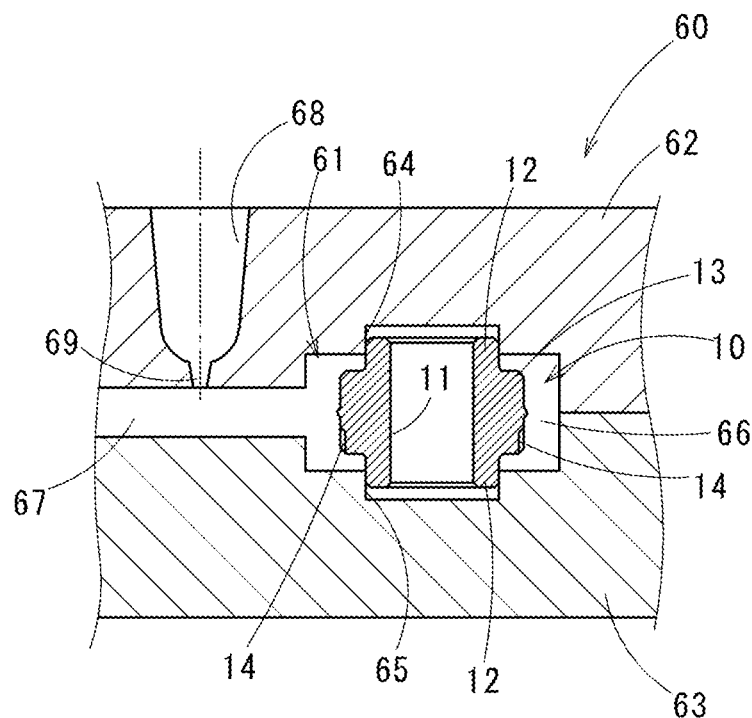
FIG. 8 is a vertical cross-sectional view showing a state after a mold clamping step in an injection molding step.

As shown in FIG. 8, the injection forming mold 60 has a fixed mold 62 and a movable mold 63, holding the sintered bearing 10 between the fixed mold 62 and the movable mold 63 and forming the cavity 61 into which the melted resin is filled around the sintered bearing 10. The sintered bearing 10 is held in a fit-inserted state to the middle position of the length direction (the axis direction) of both end portions 12 in concave portions 64 and 65 of the fixed mold 62 and the movable mold 63, so that inner peripheral surfaces of the concave portion 64 and the concave portion 65 are in contact with the outer peripheral surfaces of the end portions 12 of the sintered bearing 10 over whole circumference.

The cavity 61 has a shaft holding space 66 formed to surround the outer circumference of the sintered bearing 10 and a connected portion 67 connected to the shaft holding space 66. In the shaft holding space 66 of the cavity 61, the large diameter portion 13 of the sintered bearing 10 and a base end portion (the root portion) of the end portions 12 in the vicinity of the large diameter portion 13 are exposed. To the cavity 61, a sprue 68 supplying the melted resin is connected via a gate 69; and a plunger (not illustrated) to inject the melted resin to the sprue 68 is connected.

(Injection Step)

As shown in FIG. 8, the melted resin is injected into the cavity 61 of the injection forming mold 60 which is clamped. At this time, although the injection pressure is applied in the cavity 61, since the tip end of each end portion 12 is not exposed in the cavity 61 because the tip end of the end portions 12 of the sintered bearing 10 are disposed in the fit inserted state to the concave portion 64 of the fixed mold 62 and the concave portion 65 of the movable mold 63, the injection pressure is applied on the outer surface of the sintered bearing 10 except for the tip ends of the end portions 12.

Accordingly, the melted resin does not leak out to the end surfaces of the sintered bearing 10. Even if the melted resin enters between abutting surfaces of the sintered bearing 10 and the injection forming mold 60 at the worst, it is a degree that it may leak slightly to the outer peripheral surfaces of the end portions 12 of the sintered bearing 10.

Accordingly, in the insert bearing 1, as shown in FIG. 1, the center portion including the large diameter portion 13 except for the tip end of each end portions 12 of the sintered bearing 10 is surrounded by the resin component 20, the sintered bearing 10 and the resin component 20 are prevented from rotating by the grooves 14 and integrated in a state of being prevented from taking off in the axis direction by the large diameter portion 13. Furthermore, since such resin film on each end surface of the sintered bearing that is described in the prior arts is not formed, the appearance is not deteriorated and the interfering with the other component can be suppressed.

Second Embodiment

Figure 9:
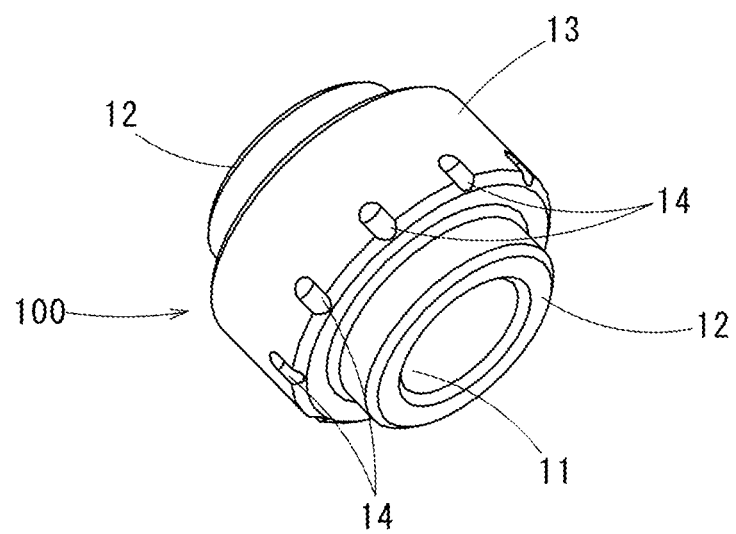
FIG. 9 is a perspective view of a sintered bearing used for an insert bearing of a second embodiment of the present invention.
Figure 10:
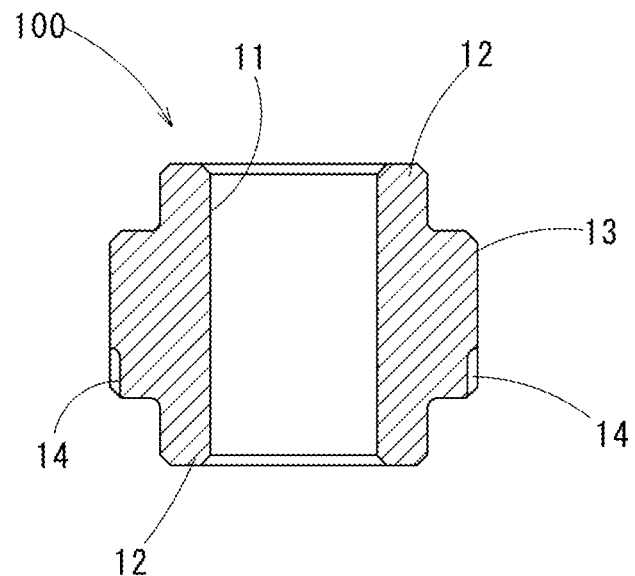
FIG. 10 is a vertical cross-sectional view of the sintered bearing of FIG. 9.
Figure 11:
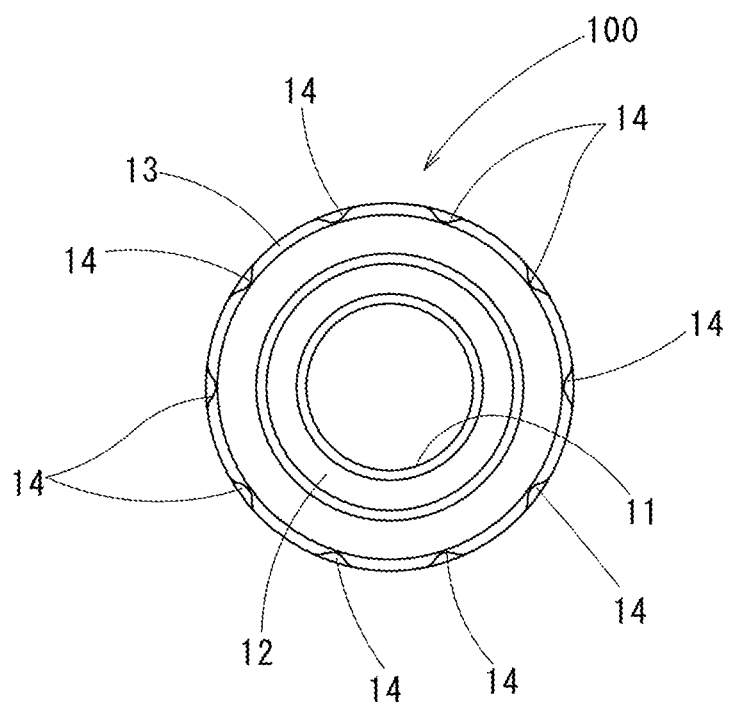
FIG. 11 is an end view of the sintered bearing of FIG. 9 viewed from one side of an axis direction.

FIG. 9 to FIG. 11 show a sintered bearing 100 used for an insert bearing of a second embodiment. In the sintered bearing 100 of the second embodiment, the annular rib 15 of the large diameter portion 13 provided in the sintered bearing 10 of the first embodiment is not formed. Note that, in each of the second embodiment and subsequent embodiments, elements common to the first embodiment are denoted by the same reference symbols to simplify the description.

In the second embodiment, two reforming steps are performed. That is, in the first reforming, the grooves 14 are formed on the outer peripheral portion of the large diameter portion 13 by the method described in the first embodiment (first reforming). In the first reforming, the grooves and also the annular rib 15 are formed on the outer peripheral portion of the large diameter portion 13. In the second embodiment, the annular rib 15 is removed in a second reforming (second reforming). In the second reforming, the outer peripheral surface of the large diameter portion 13 is reformed by the inner peripheral surface of the die formed in a cylindrical surface, and the outer peripheral surface of the large diameter portion 13 is finished to a cylindrical surface.

Figure 12:
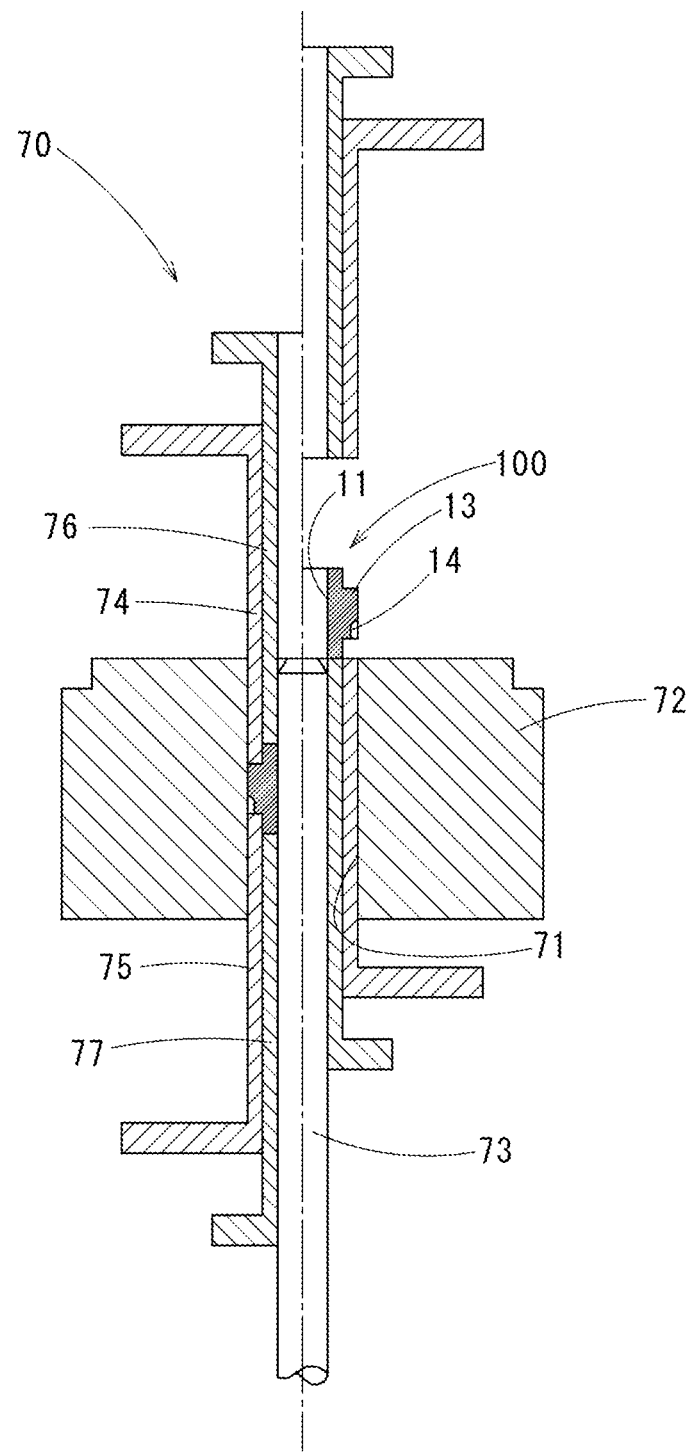
FIG. 12 is a vertical cross-sectional view in which a left half shows a state of reforming a sintered body and a right half shows a state of taking the sintered body off from a reforming mold, in a second reforming in a reforming step.

FIG. 12 shows a reforming mold 70 used for the second reforming. The reforming mold 70 is provided with a first upper punch 74 and a first lower punch 75, and a second upper punch 76 and a second lower punch 77 respectively from outside, forming each upper/lower pair, between a die 72 in which a circular penetrate hole 71 is formed and a core rod 73 disposed in the penetrate hole 71. However, unlike the reforming mold 50 used for the first reforming (refer to FIG. 7), the cylindrical inner peripheral surface of the die 72 forms the outer peripheral surface of the large diameter portion 13 and an upper end of the first lower punch 75 is brought into contact with an end surface of the large diameter portion 13.

After the second reforming, injection molding is performed in the same manner as in the first embodiment to obtain an insert bearing (not illustrated) in which a central portion including the large diameter portion 13 except for the tip end of each end portion 12 of the sintered bearing 100 are surrounded by the resin component 20 (refer to FIG. 1) and integrated.

This insert bearing is also prevented from rotating the sintered bearing 100 and the resin component 20 by the grooves 14 and integrated in a prevented state from taking off in the axis direction by the large diameter portion 13 as in the first embodiment; and moreover, since the resin film is not formed on each end surface of the sintered bearing 100, the appearance is not deteriorated and the interfering with the other component can be suppressed.

Third Embodiment

Figure 13:
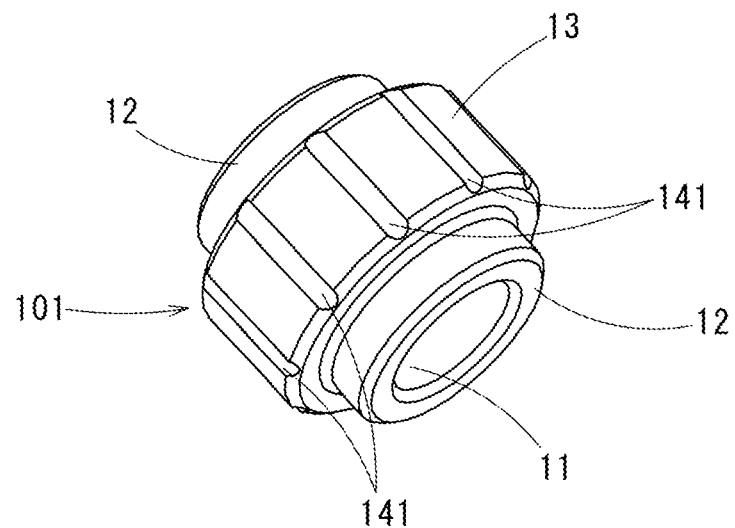
FIG. 13 is a perspective view of a sintered bearing used for an insert bearing of a third embodiment of the present invention.
Figure 14:
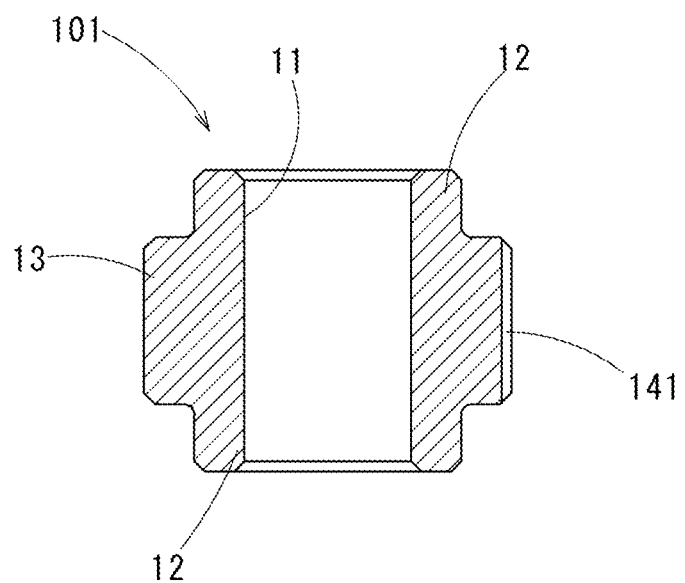
FIG. 14 is a cross-sectional view of the sintered bearing of FIG. 13.
Figure 15:
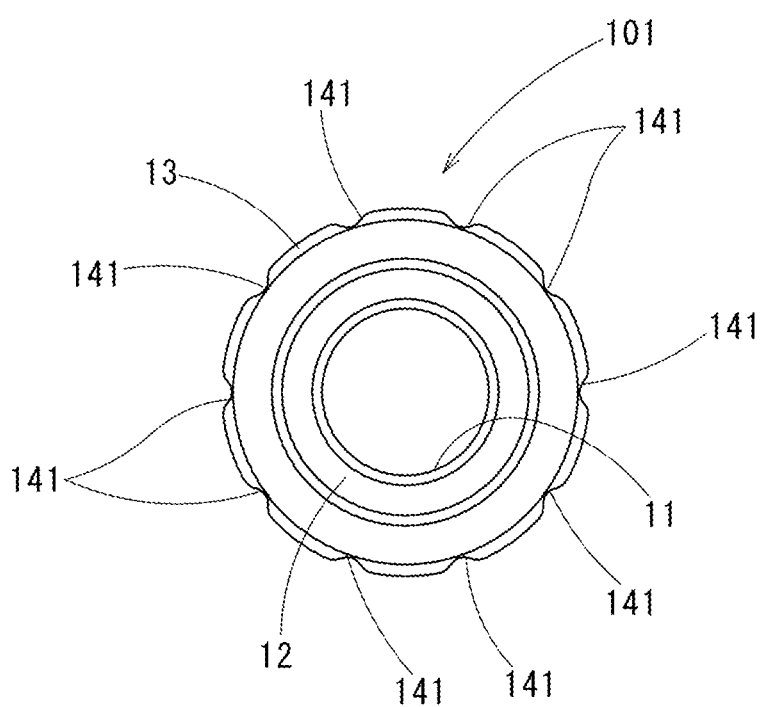
FIG. 15 is an end view of the sintered bearing of FIG. 13 viewed from one side of the axis direction.

FIG. 13 to FIG. 15 show a sintered bearing 101 used for an insert bearing of a third embodiment. The sintered bearing 101 of the third embodiment has the large diameter portion 13 in which a plurality of grooves 141 along the axis direction over the entire length of the large diameter portion 13 between the end surfaces of the large diameter portion 13 are formed on the outer peripheral portion.

Figure 16:
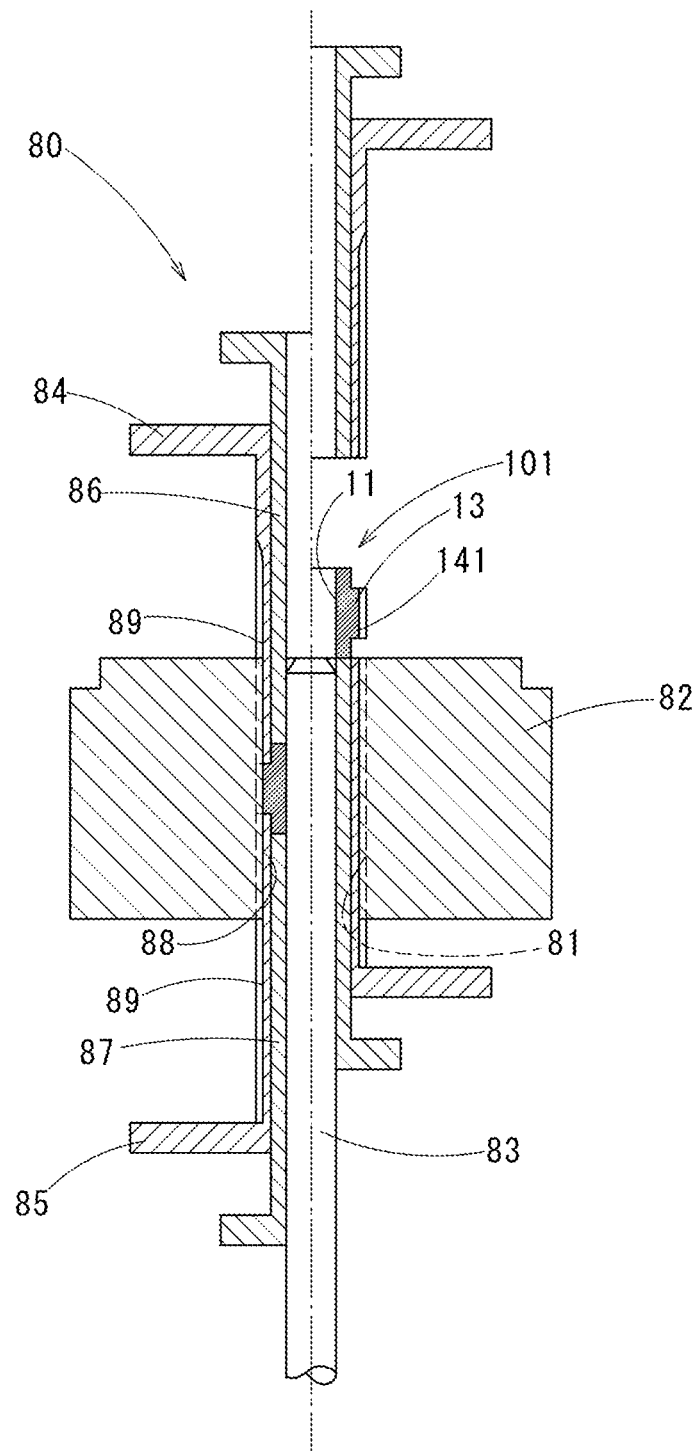
FIG. 16 is a vertical cross-sectional view in which a left half shows a state of reforming a sintered body and a right half shows a state of taking the sintered body from the reforming mold, in the reforming step.

When manufacturing the sintered bearing 101, after the forming step and the sintering step in the sintered bearing forming step, a reforming mold 80 shown in FIG. 16 is used in a reforming step. A reforming mold 80 is provided with a first upper punch 84 and a first lower punch 85, and a second upper punch 86 and a second lower punch 87 making respective upper/lower pairs, between a die 82 in which a circular penetrate hole 81 is formed and a core rod 83 disposed in the penetrate hole 81.

A plurality of annular ribs 88 are formed on an inner peripheral surface of the penetrate hole 81 of the die 82 with intervals in the circumference direction over entire length of an axis direction. Grooves 89 which are slidably fit-inserted in these annular ribs 88 are formed with intervals in the circumference direction on the outer peripheral portions of the first upper punch 84 and the first lower punch 85.

By reforming the sintered body disposed in the reforming mold 80, the grooves 141 are formed with intervals in the circumference direction on the outer peripheral portion of the large diameter portion 13.

The insert bearing formed from the sintered bearing 101 is also prevented from rotating the sintered bearing 101 and the resin component 20 by the grooves 141 in the same manner as in the other embodiments and integrated in a state of being prevented by the large diameter portion 13 from taking off in the axis direction, and the resin film is not formed each end surface of the sintered bearing 101, so that the appearance is not deteriorated and the interfering with the other component is also suppressed.

Fourth Embodiment

Figure 17:
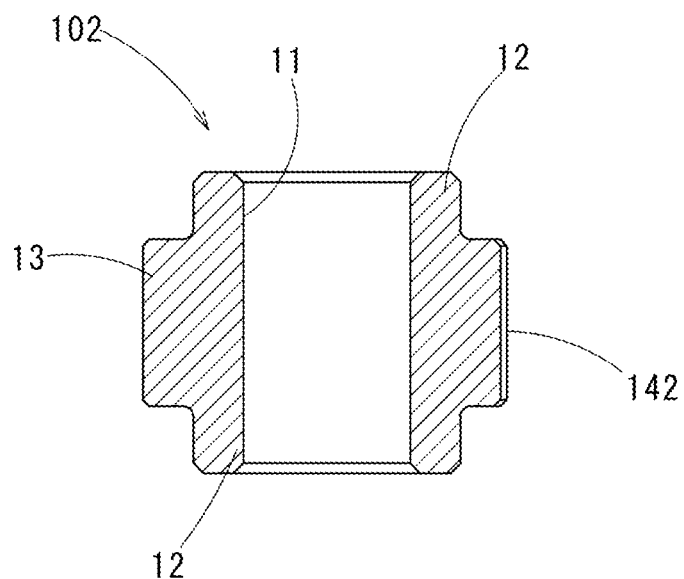
FIG. 17 is a vertical cross-sectional view of a sintered bearing used for an insert bearing of a fourth embodiment of the present invention.
Figure 18:
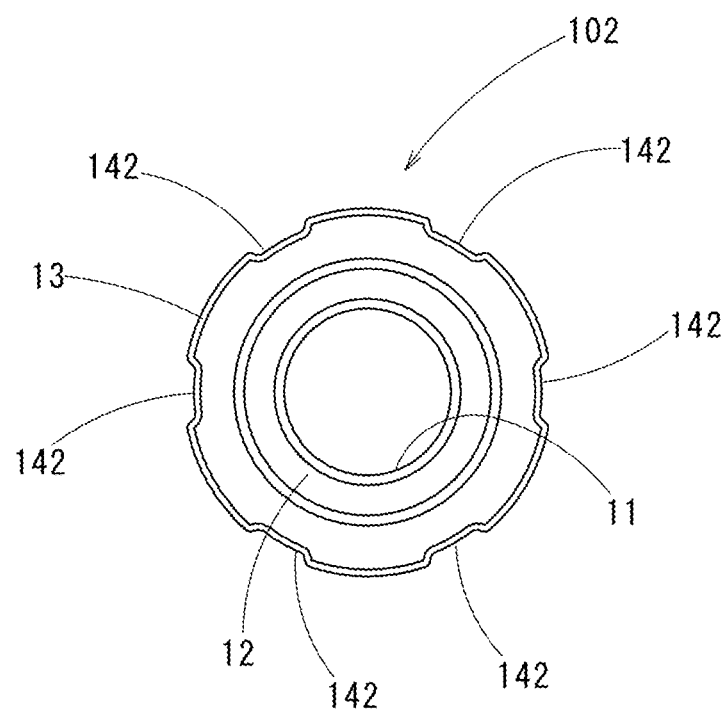
FIG. 18 is an end view of the sintered bearing of FIG. 17 viewed from one side of an axis direction.

FIG. 17 and FIG. 18 show a sintered bearing 102 used for an insert bearing of a fourth embodiment. In the sintered bearing 102 of the fourth embodiment, a plurality of grooves 142 along the axis direction are formed on the large diameter portion 13 of the sintered bearing 102 between both end surfaces of the large diameter portion 13 over the entire length of the large diameter portion 13 in the same manner as in the third embodiment. However, in the fourth embodiment, a section area of the grooves 142 is larger than that of the grooves 141 in the third embodiment, so that the grooves 142 are formed in a forming step not in the reforming step.

That is, although the illustration is omitted, a forming mold is structured as in the reforming mold 80 of the third embodiment, a plurality of ridges penetrating along the axis direction (over the entire length) are formed on the inner peripheral portion of the penetrate hole of the die with intervals in the circumference direction, and the grooves to which the ridges of the die are slidably fitted are formed on the outer peripheral portion of the first lower punch and the first upper punch with intervals in the circumference direction. By the ridges of the die, the grooves 142 are formed on the outer peripheral portion of the large diameter portion of the formed body.

Performing the sintering step and the reforming step on the formed body in which the grooves 142 are formed on the outer peripheral portion of the large diameter portion 13 to form the sintered bearing 102, and integrating with the resin component 20 by injection molding to surround the large diameter portion 13 thereof, the insert bearing is manufactured.

Fifth Embodiment

Figure 19:
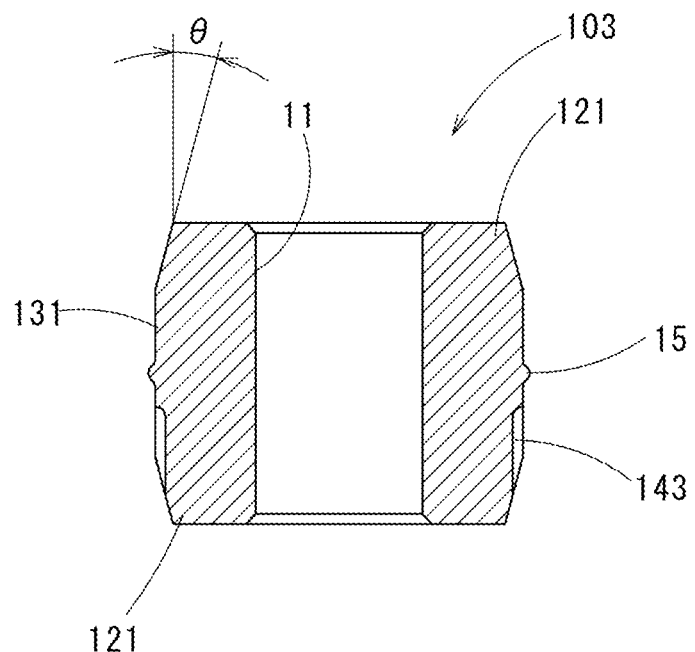
FIG. 19 is a vertical cross-sectional view of a sintered bearing used for an insert bearing of a fifth embodiment of the present invention.
Figure 20:
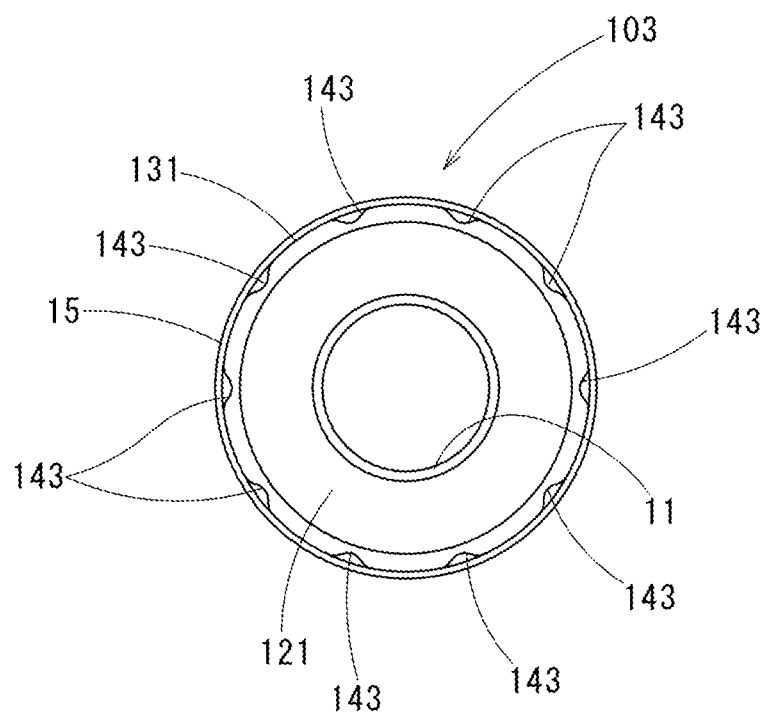
FIG. 20 is an end view of the sintered bearing of FIG. 19 viewed from one side of an axis direction.

FIG. 19 and FIG. 20 show a sintered bearing 103 used for an insert bearing of a fifth embodiment. In the sintered bearing 103 of the fifth embodiment, end portions 121 are not a straight cylindrical shape and formed into a tapered shape in which an outer diameter is gradually decreased from a large diameter portion 131 toward both ends.

Angle θ of a tapered surface of each end portion (tapered portion) 121 is formed 15° (30° as a taper angle), for example. Grooves 143 formed on the large diameter portion 131 are formed to the middle of the length direction (axis direction) of the large diameter portion 131; a tip end in an open state is formed in a tapered surface (end surface of the large diameter portion 131). the annular rib 15 is formed in the center position in the height direction of the large diameter portion 131 along the circumference direction.

The sintered bearing 103 is formed by the sintered bearing forming step in the manner as in the first embodiment. The tapered surface of the end portions 121 is formed in the forming step; however, if the inclined angle θ is small, it may be formed in the reforming step.

Figure 21:
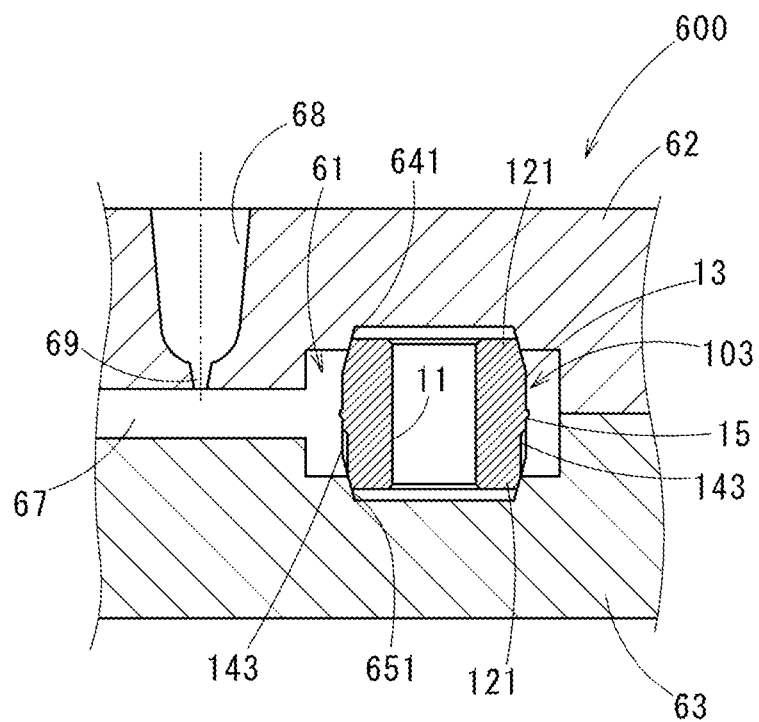
FIG. 21 is a vertical cross-sectional view showing a state after a mold clamping step in an injection molding step.

The mold clamping step in the injection molding step is carried out by an injection forming mold 600 shown in FIG. 21. Inner peripheral surface of concave portions 641 and 651 of the fixed mold 62 and the movable mold 63 which are clamped are formed in tapered surface with the same angle of the end portions 121 of the sintered bearing 103. The end portions 121 of the sintered bearing 103 are taper-fitted to the concave portion 641 and the concave portion 651.

In this mold clamping state, since the tapered surfaces of the end portions 121 of the sintered bearing 103 are fitted to the tapered surfaces of the concave portions 641 and 651 of the injection forming mold 600, comparing with a state in which the straight cylindrical surfaces are in contact with each other as in the first embodiment, the melted resin do not easily enter between the tapered surfaces, and the resin leaking can be reliably prevented not only the both end surfaces and at the outer peripheral surface (tapered surface) of the end portions 121.

The annular rib 15 formed at the middle position of the large diameter portion 131 may be removed in a second reforming, by performing two reforming steps as in the second embodiment.

Sixth Embodiment

Figure 22:
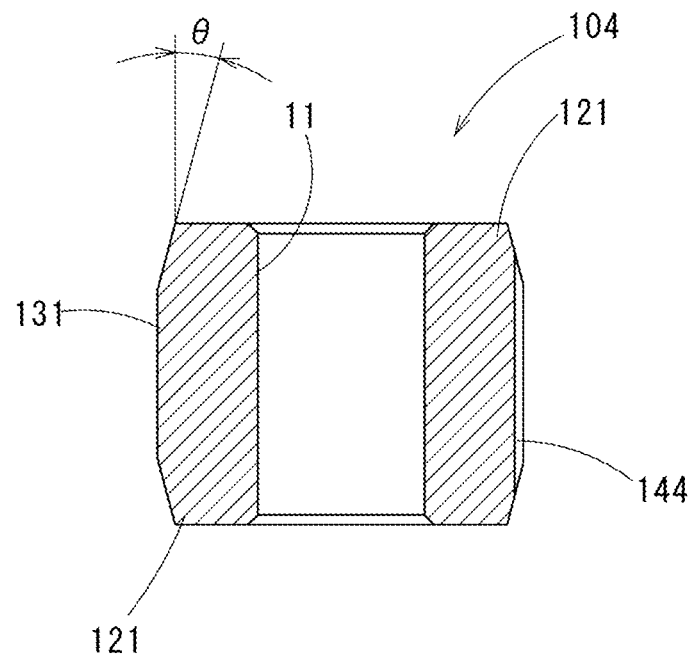
FIG. 22 is a vertical cross-sectional view of a sintered bearing used for an insert bearing of a sixth embodiment of the present invention.
Figure 23:
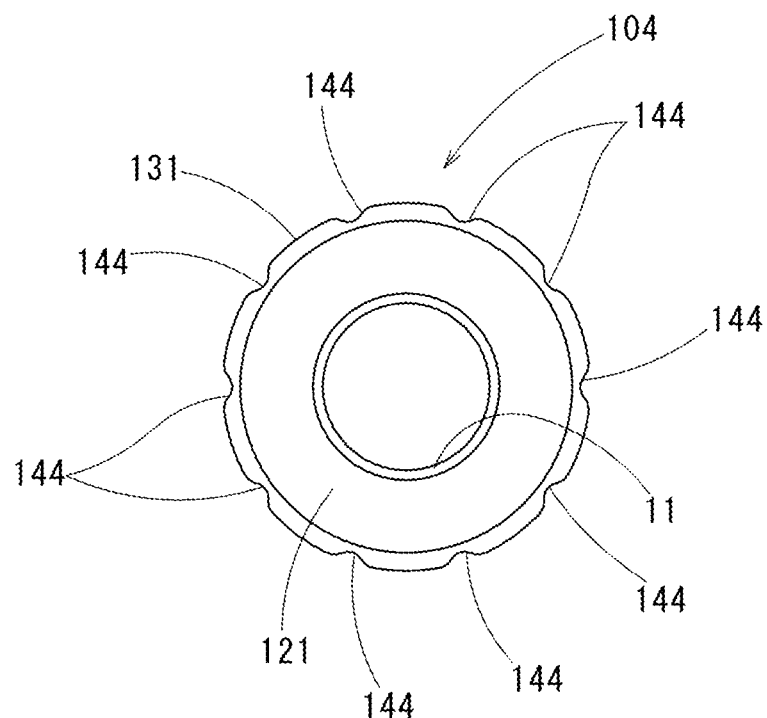
FIG. 23 is an end view of the sintered bearing of FIG. 22 viewed from one side of an axis direction.

FIG. 22 and FIG. 23 show a sintered bearing 104 used for an insert bearing of a sixth embodiment. In the sintered bearing 104 of the sixth embodiment, the end portions 121 is formed in a tapered shape in which an outer diameter is gradually decreased form the large diameter portion 131 toward both ends, similarly to the sintered bearing 103 of the fifth embodiment. The inclined angle θ of the tapered surface is formed 15° (taper angle) 30°, for example.

The grooves 144 formed on the large diameter portion 131 are formed over the entire length of the large diameter portion 131; both ends which are open are formed on the tapered surfaces respectively.

Although the illustration is omitted, it may be applicable that the cross-sectional area of the grooves 144 of the sintered bearing 104 in the sixth embodiment is increased as large as that of the grooves 142 in the sintered bearing 102 of the fourth embodiment to form the grooves in the forming step not in the reforming step, and so on.

A seventh embodiment to an eleventh embodiment will be explained with examples in which a large diameter portion is provided in a region except for one end portion of an outer peripheral portion of a sintered bearing of an insert bearing and this large diameter portion has an outer diameter larger than the one end portion of the sintered bearing.

Seventh Embodiment

Figure 24:
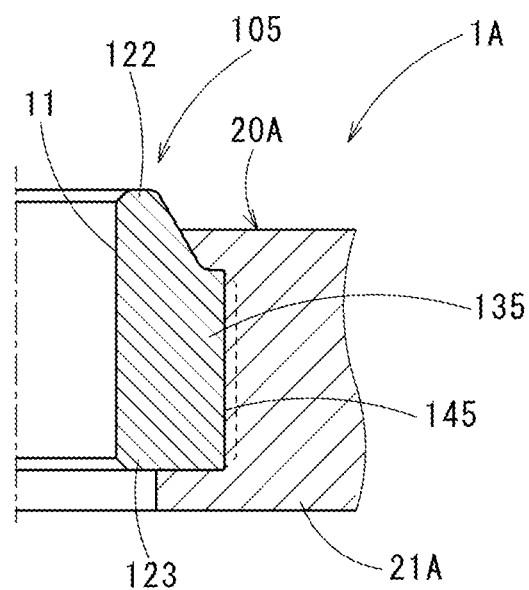
FIG. 24 is a vertical cross-sectional view magnifying and showing a portion of an insert bearing of a seventh embodiment of the present invention.
Figure 25:
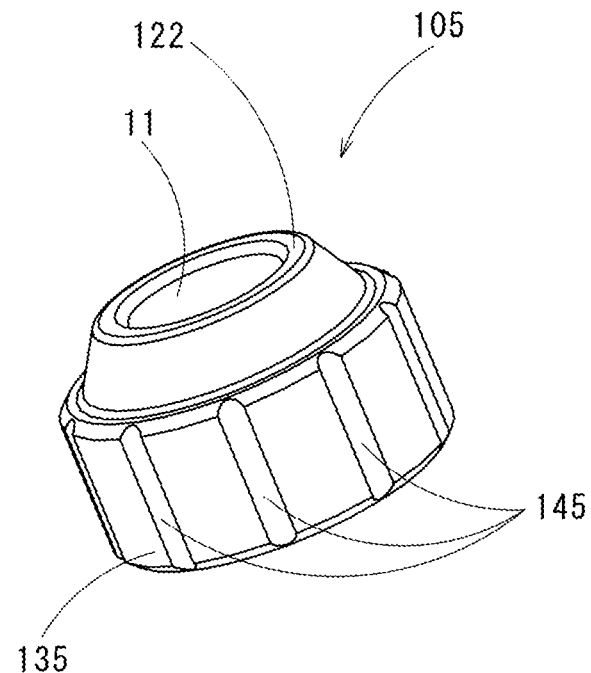
FIG. 25 is a perspective view of a sintered bearing used for the insert bearing of FIG. 24.

FIG. 24 shows a longitudinal cross section of a portion (a half of a sintered bearing 105 and a portion of a resin component (an exterior component) 20A) of an insert bearing 1A (sintered insert component) of a seventh embodiment; and FIG. 25 shows the sintered bearing 105 used for the insert bearing 1A. Although only a portion of the insert bearing 1A is shown in FIG. 24, the overall shape is the same as that shown in FIG. 1.

The sintered bearing 105 of the seventh embodiment has a tapered first end portion 122 similarly to the sintered bearing 103 of the fifth embodiment and the sintered bearing 104 of the sixth embodiment, but has a large diameter portion 135 which is different from the sintered bearings 10 and 101 to 104 of the first to sixth embodiments, extending to the end surface of a second end portion 123. That is, an end surface of the large diameter portion 135 and an end surface of the second end portion 123 are arranged in a same plane and continue to each other.

In the sintered bearing 105, an outer peripheral portion of a region except for a tip end (an end portion at a side continuing to the end surface of the first end portion 122) of the first end portion 122 is embedded in the resin component 20A. That is, in the resin component 20A, the tip end portion of the first end portion 122 is exposed in the outer peripheral portion of the sintered bearing 105, and the base end portion (root portion) of the first end portion 122 and the large diameter portion 135 are embedded.

That is, in the resin component 20A, a shaft holding portion 21A is fixed integrally to the outer peripheral portion of the sintered bearing 105; the shaft holding portion 21A is formed to have substantially a same height as the overall height of the sintered bearing 105; and the sintered bearing 105 is embedded from the middle portion in the axis direction of the first end portion 122 and overall the large diameter portion 13. Accordingly, both end surfaces of the large diameter portion 13 are covered by the shaft holding portion 21.

The first end portion 122 of the sintered bearing 105 is formed to be a taper shape in which the outer diameter is reduced gradually from the large diameter portion 135 toward the tip end of the first end portion 122. The incline angle of this tapered face is formed 15° (taper angle 30°), for example.

Grooves 145 formed on the large diameter portion 135 are formed over the entire length of the large diameter portion 131; and both ends in an open state are formed on the tapered face respectively. Note that the shape and the like of the grooves 145 are substantially the same as the grooves 141 shown in FIG. 13.

A manufacturing method of such an insert bearing 1A is substantially the same as the manufacturing method of the sintered bearing 10 of the above-described first embodiment; however, a shape of the injection forming mold used for the injection molding step is partly different. Details will be explained below.

Figure 26:
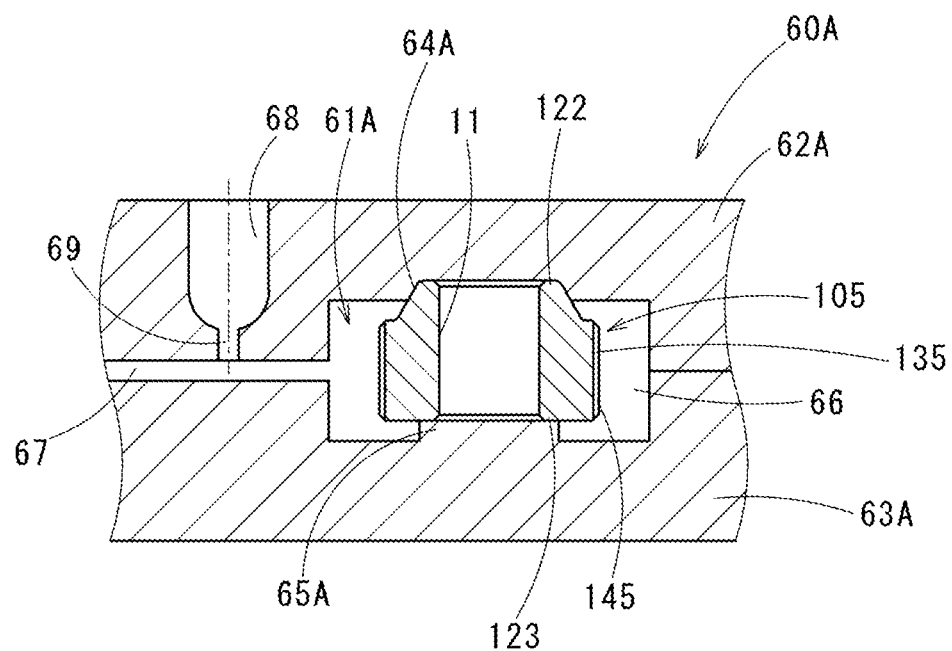
FIG. 26 is a vertical cross-sectional view showing a state of a mold clamping step in an injection molding step in a method of manufacturing the insert bearing of FIG. 24.

FIG. 26 is a longitudinal cross-sectional view showing a state in the mold clamping step of the injection molding step in the manufacturing method of the insert bearing 1A.

An injection forming mold 60A has a fixed mold 62A and a movable mold 63A as shown in FIG. 26; the sintered bearing 105 is held between the fixed mold 62A and the movable mold 63A, and a cavity 61A into which the melted resin is filled is formed on the outer peripheral portion of the sintered bearing 105.

The sintered bearing 105 is held in a fit-inserted state to the middle position of the length direction (axis direction) of the first end portion 122 in a concave portion 64A of the fixed mold 62A. As a result, the inner peripheral surface of the concave portion 64A is in contact with the outer peripheral surface of the first end portion 122 of the sintered bearing 105 over the entire circumstance. An end surface of a protrusion 65A protruding from the inner face of the movable mold 63A is in contact. with the end surface of the second end portion 123.

The cavity 61 has a shaft holding space 66 formed to surround the outer periphery of the sintered bearing 105 and a connected portion 67 connected to the shaft holding space 66. In the shaft holding space 66 of the cavity 61A, the outer peripheral surface and an end surface of the large diameter portion 135 of the sintered bearing 105 and the base end portion (root portion) of the first end portion 122 in the vicinity of the large diameter portion 135 are exposed.

A sprue 68 supplying the melted resin is connected to the cavity 61 via a gate 69, and a plunger (not illustrated) to inject the melted resin is connected to the sprue 68.

The melted resin is injected into the cavity 61A of the clamped injection forming mold 60A. At this time, although the injection pressure is applied in the cavity 61A, the tip end of the first end portion 122 of the sintered bearing 105 is fit inserted in the concave portion 64A of the fixed mold 62A, and the second end portion 123 is in contact with the protrusion 65A in the concave portion 65A of the movable mold 63A.

Since the tip end of the first end portion 122 is not exposed in the cavity 61A, the injection pressure applies on the outer surface of the sintered bearing 105 except for the tip end of the first end portion 122. Accordingly, the melted resin does not leak on the end surface of the first end portion 122 of the sintered bearing 105. Even if the melted resin enters between abutting surfaces of the sintered bearing 105 and the mold 60A, it is a degree that it may leak slightly to the outer peripheral surfaces of the first end portion 122 of the sintered bearing 105.

Accordingly, the insert bearing 1A is integrated in a state in which a region (outer peripheral surface and both end surfaces of the large diameter portion 13) of the sintered bearing 105 except for the tip end of the first end portion 122 is surrounded by the resin component 20A, the sintered bearing 105 and the resin component 20A are prevented from rotating by the grooves 145, and prevented from taking off in the axis direction by the large diameter portion 135. Moreover, since the resin film as described in the prior arts is not formed on both end surfaces of the sintered bearing, the appearance is not deteriorated, and the interfering with the other component is also suppressed.

Eighth Embodiment

Figure 27:
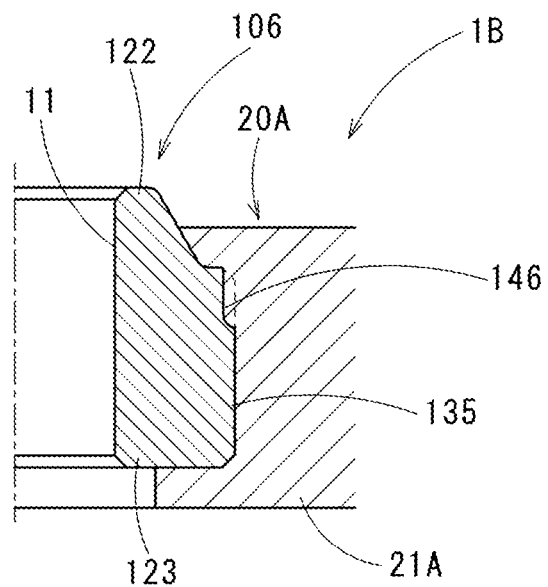
FIG. 27 is a vertical cross-sectional view magnifying and showing a portion of an insert bearing of an eighth embodiment of the present invention.
Figure 28:
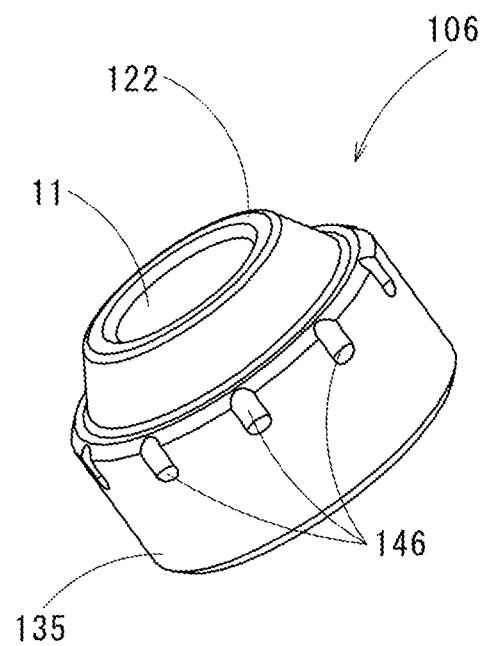
FIG. 28 is a perspective view of a sintered bearing used for the insert bearing of FIG. 27.

FIG. 27 shows an enlarged portion of an insert bearing 1B (sintered insert component) of an eighth embodiment; FIG. 28 shows a sintered bearing 106 used for the insert bearing 1B.

A sintered bearing 106 of an eighth embodiment also has the large diameter portion 135 similarly to the seventh embodiment as shown in FIGS. 27 and 28; however, only a shape of grooves formed on the large diameter portion 135 is different from the sintered bearing 105 of the seventh embodiment. In each of the eighth embodiment and subsequent embodiment, elements common to the seventh embodiment are denoted by the same reference symbols to simplify the description.

Ten grooves 146 provided on the large diameter portion 135 of the sintered bearing 106 are formed to be shorter than half a length (height) of the large diameter portion 135 at an end surface side at the first end portion 122 side of the large diameter portion 135 at 36° intervals, as shown in FIGS. 27 and 28. The grooves 146 have a shape in which the deepest portion is formed a concave arc surface, and both ends thereof are connected to the outer peripheral surface of the large diameter portion 135 with a protrude arc surface. The shape and the like of the grooves 146 are substantially the same as the grooves 14 of the sintered bearing 10 in the first embodiment shown in FIG. 2.

Ninth Embodiment

Figure 29:
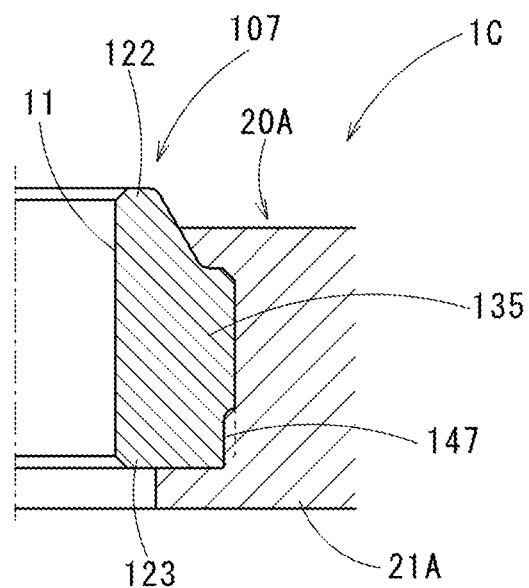
FIG. 29 is a vertical cross-sectional view magnifying and showing a portion of an insert bearing of ninth embodiment of the present invention.
Figure 30:
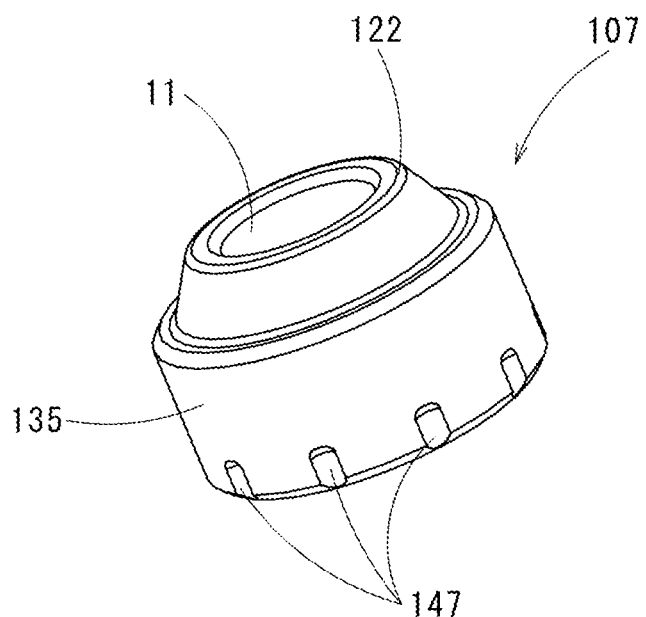
FIG. 30 is a perspective view of a sintered bearing used for the insert bearing of FIG. 29.

FIG. 29 shows an insert bearing 1C (sintered insert component) of a ninth embodiment; and FIG. 30 shows a sintered bearing 107 used for the insert bearing 1C. The sintered bearing 107 of the ninth embodiment has, as shown in FIGS. 29 and 30, the large diameter portion 135 similarly to the sintered bearing 105 of the seventh embodiment; only a shape of grooves formed on the large diameter portion 135 is different from the sintered bearing 105 of the seventh embodiment.

As shown in FIGS. 29 and 30, ten grooves 147 formed on the large diameter portion 135 of the sintered bearing 107 are shorter than half a length (height) of the large diameter portion 135 and formed at 36° intervals at an end surface side at the second end portion 123 side of the large diameter portion 135. The grooves 147 has a shape in which a deepest portion thereof is formed to be a concave arc surface, and both sides thereof connected to the outer peripheral surface of the large diameter portion 135 via a convex arc surface. In addition, a shape and the like of the grooves 147 is substantially the same as that of the grooves 14 of the sintered bearing 100 of the second embodiment shown in FIGS. 9 to 11 and the grooves 146 of the sintered bearing 106 of the eighth embodiment shown in FIGS. 27 and 28.

Tenth Embodiment

Figure 31:
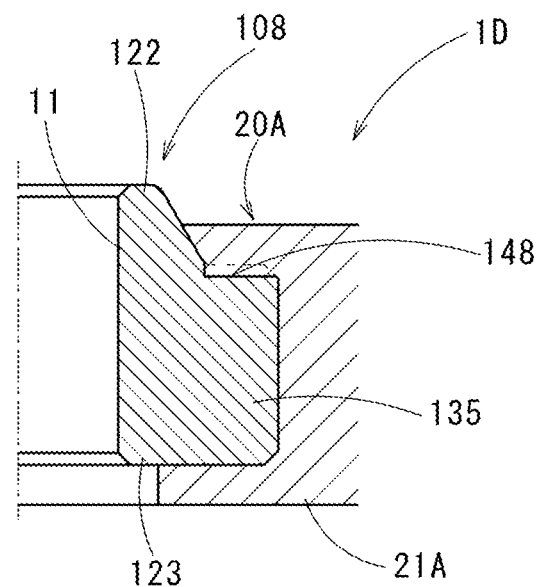
FIG. 31 is a vertical cross-sectional view magnifying and showing a portion of an insert bearing of a tenth embodiment of the present invention.
Figure 32:
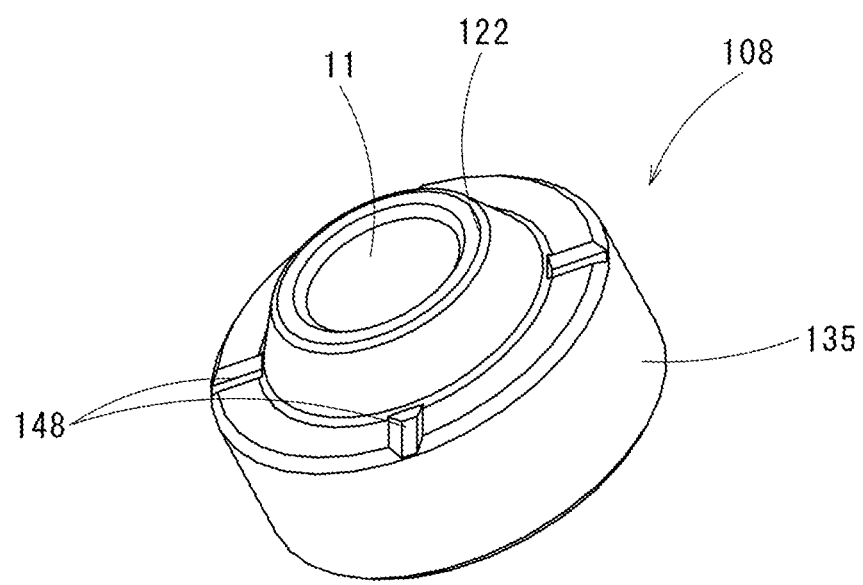
FIG. 32 is a perspective view of a sintered bearing used for the insert bearing of FIG. 31.

FIG. 31 shows and insert bearing 1D (sintered insert component) of a tenth embodiment; and FIG. 32 shows a sintered bearing 108 used for the insert bearing 1D. The sintered bearing 108 of the tenth embodiment has the large diameter portion 135 similarly to the sintered bearing 105 of the seventh embodiment as shown in FIGS. 31 and 32; only a shape of grooves formed on the large diameter portion 135 is different from the sintered bearing 105 of the seventh embodiment.

Four grooves 148 formed on the large diameter portion 135 of the sintered bearing 108 are formed on an end surface of the large diameter portion 135 at the first end portion 122 side as shown in FIGS. 31 and 32. The grooves 148 are formed at 90° intervals and extend in a radial diameter on the end surface of the first end portion 122 side of the large diameter portion 135. The grooves 148 have a flat surface at the deepest portion and an inclined surface which gradually increases in a diameter upward from the deepest portion.

Eleventh Embodiment

Figure 33:
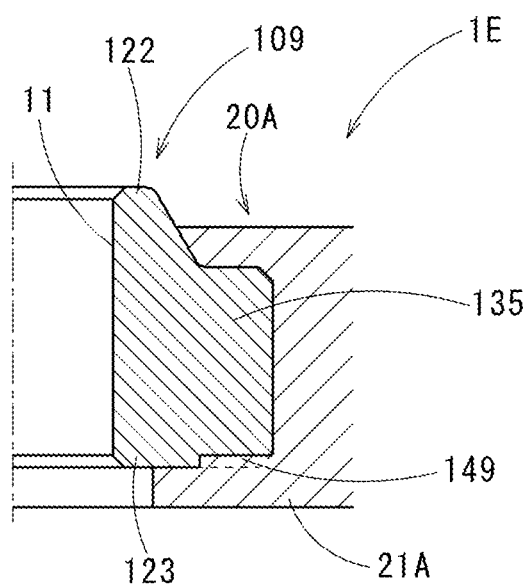
FIG. 33 is a vertical cross-sectional view magnifying and showing a portion of an insert bearing of eleventh embodiment of the present invention.
Figure 34:
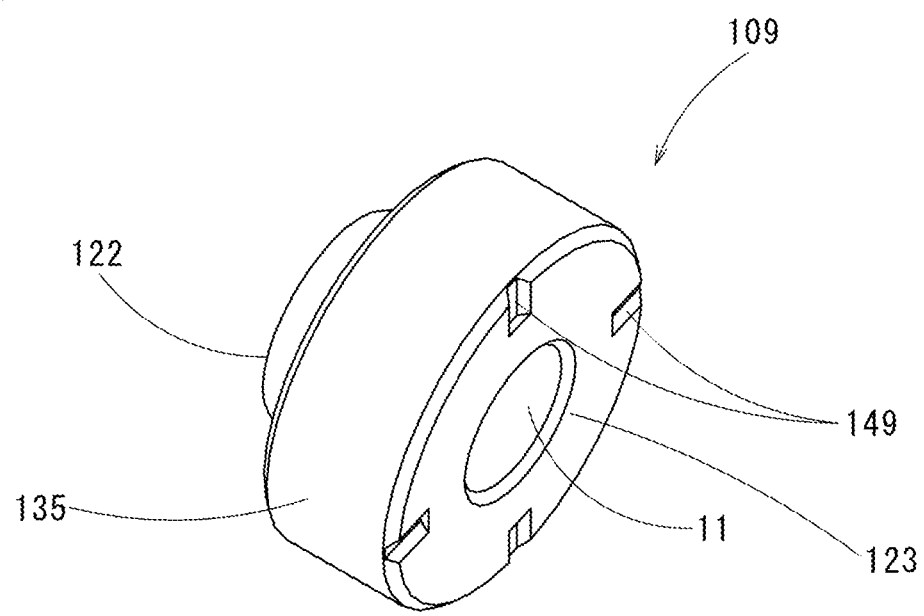
FIG. 34 is a perspective view of a sintered bearing used for the insert bearing of FIG. 33.

FIG. 33 shows an insert bearing 1E (insert sintered component) of an eleventh embodiment; and FIG. 34 shows a sintered bearing used for the insert bearing 1E. The sintered bearing 109 of the eleventh embodiment has the large diameter portion 135 similarly to the sintered bearing 108 of the tenth embodiment as shown in FIGS. 33 and 34; only a shape of grooves formed on the large diameter portion 135 is different from the sintered bearing 108 of the tenth embodiment.

Four grooves 149 formed on the large diameter portion 135 of the sintered bearing 109 are, as shown in FIGS. 33 and 34, formed on an end surface of the large diameter portion 135 on the opposite side to the first end portion 122 (i.e., at the second end portion 123 side). The grooves 149 are formed at 90° intervals and extend in a radial direction of the end surface of the large diameter portion 135. The end surface of the large diameter portion 135 is even with the end surface of the second end portion 123; however, the grooves 149 do not encroach in the end surface of the second end portion 123. That is, the grooves 149 extend in the radial direction within a range of the large diameter portion 135. In addition, the shape of the grooves 148 is the same as that of the grooves 148.

In the tenth embodiment and the eleventh embodiment, the grooves 148 and 149 are formed on the end surface; also in these cases, since the grooves 148 and 149 are embedded in the resin component 20A, the same effect as in the above-described embodiments can be shown.

That is, the groove portion formed on the large diameter portion 135 may be formed on the outer peripheral surface of the large diameter portion 135 or may be formed on the end surface, and may be formed on both the outer peripheral surface and the end surface of the large diameter portion 135.

In addition, the present invention is not limited to the above-described embodiments and various modifications may be made without departing from the scope of the present invention.

For example, the grooves are formed on the large diameter portion in the above embodiments; however, ridges along the axis direction may be made instead of the grooves. A plurality of the grooves or the ridges may preferably be formed at intervals in the circumferential direction, but only one may be formed.

The exterior component are formed of resin and insert molded by injection forming in the embodiments; however, the present invention can be applied to one in which an exterior component is a metal component of aluminum alloy or the like having lower melting point than a sintered bearing made of iron or copper to form by insert by casting, for example. In that case, by clamping the mold (the mold clamping step) by disposing a sintered component in a mold (insert mold) and filling melted metal (melted material) to be the metal component in the cavity around it (the filling step) after the sintered bearing forming step, the exterior component made of metal and the sintered bearing are integrated.

In the above-described embodiments, the sintered component is exemplified by the sintered bearing and the sintered insert component is exemplified by the insert bearing; but it is not limited to this. For example, the sintered component may be a valve seat or a bushing. Although substantially a cylindrical radial bearing is exemplified in each of the above-described embodiments, the present invention can also be applied to a sintered component such as a plate-like pivot bearing, for example. That is, the present invention is not limited to a sintered bearing but can be applied if it is a sintered component, and can be applied all products in which a sintered component and an exterior component are integrated.

INDUSTRIAL APPLICABILITY

A sintered component such as a sintered bearing or the like and an exterior component are prevented from rotating by a groove or a ridge and integrated; and the sintered component and the exterior component can be integrated by injection molding without forming a film of material of the exterior component on at least one end surface of the sintered component.

REFERENCE SIGNS LIST 1, 1A, 1B, 1C, 1D, 1E Insert bearing (sintered insert component)
10, 100, 101, 102, 103, 104, 105, 106, 107, 108, 109 Sintered bearing (sintered component)
10A Formed body
11 Shaft bore
12, 121 End portion
122 End portion (first end portion)
123 End portion (second end portion)
13, 131, 135
14, 141, 142, 143, 144, 145, 146, 147, 148, 149 Groove
15,88 Annular rib
20, 20A Resin component (exterior component)
21,21A Shaft holding portion
40 Forming mold
50, 70, 80 Reforming mold
60, 60A, 600
61, 61A Cavity
62, 62A Fixed mold
63, 63A Movable mold
64, 64A, 65, 641, 651 Concave portion
65A Protrusion
66 Shaft holding space

The invention claimed is:

1. A manufacturing method of an insert bearing comprising:
   a step of forming a sintered bearing by powder molding; and
   a step of forming the insert bearing in which an exterior component is integrated with an outer circumference of the sintered bearing; wherein
   in the step of forming the sintered bearing,
      a large diameter portion having an outer diameter is formed on the outer peripheral portion of the sintered bearing, and the large diameter portion is larger than both end portions, which are provided at ends of the sintered bearing in an axial direction, and
      one or more grooves or ridges extending along an axis direction are formed on an outer peripheral surface of the large diameter portion; and
   the step of forming the insert bearing comprises:
      a mold assembling step forming a cavity on the outer peripheral portion of the sintered bearing by bringing an outer peripheral surface of a tip end portion of each of the both end portions of the sintered bearing into contact with an inner peripheral surface of an insert mold along a circumference direction while leaving a first space between the insert mold and the tip end portion of each of the both end portions, and covering around a base end portion of each end portion and the large diameter portion while leaving a second space therebetween; and
      a filling step for filling melted material into the cavity after the mold assembling step so as to be the exterior component.

2. A manufacturing method of a sintered insert component comprising:
   a sintered component forming step for forming the sintered component having a first end portion and a second end portion by powder molding, said first and second end portions being provided at ends of the sintered bearing in an axial direction; and
   an insert forming step for forming a sintered insert component in which an exterior component is integrated with an outer peripheral portion of the sintered component, wherein
   in the sintered component forming step,
   one or more grooves or ridges extending along an axis direction are formed on an outer peripheral portion of a region other than the first end portion of the sintered component, an outer peripheral surface of the first end portion having a tapered surface in which an outer diameter decreases toward a tip end portion of the first end portion, and
   the insert forming step comprises;
      a mold assembling step for holding the first end portion in a fitted state in a recess of an insert mold, bringing an outer peripheral surface of the tapered surface of the first end portion into contact with an inner peripheral surface of the recess of the insert mold along a circumference direction and a tip surface of the second end portion into contact with a surface of the insert mold, and covering the one or more grooves or ridges in the region by the insert mold with intervals so that a cavity is formed on the outer peripheral portion of the sintered component; and
      a filling step for filling melted material into the cavity after the mold assembling step so as to be the exterior component.

\* \* \* \* \*